Patented June 17, 1930

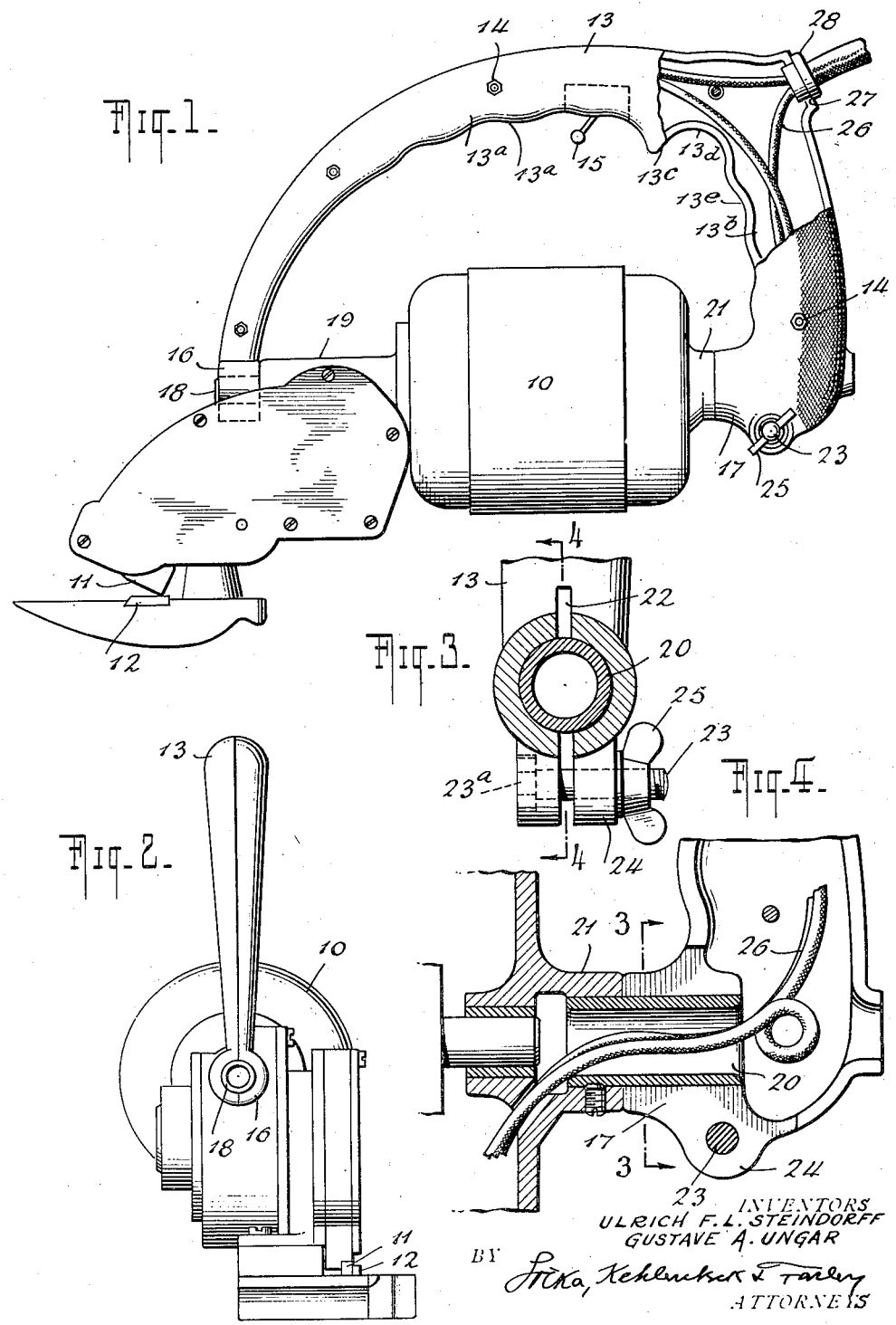

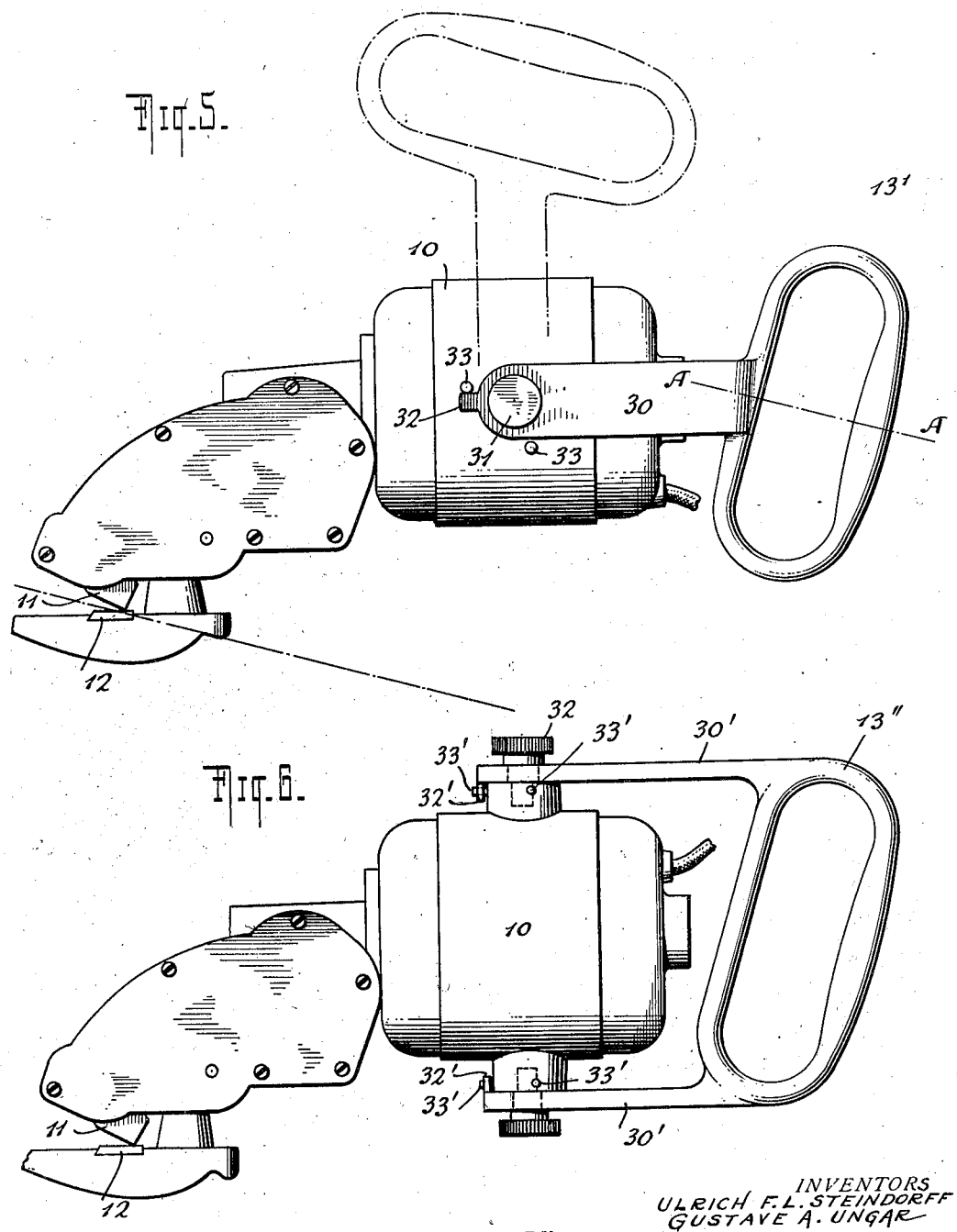

1,765,313

UNITED STATES PATENT OFFICE

ULRICH F. L. STEINDORFF, OF NEW YORK, N. Y., AND GUSTAVE A. UNGAR, OF PELHAM MANOR, NEW YORK, ASSIGNORS TO UNISHEAR COMPANY, INC., A CORPORATION OF NEW YORK

PORTABLE SHEARS

Application filed October 4, 1928. Serial No. 310,235.

This invention relates to portable power driven shears for cutting sheet material, such as metal, leather, cardboard or the like and has for its principal object to improve upon the construction of such shears and particularly to improve upon the handles by means of which the shears are held and manipulated while a shearing cut is being made.
Another object of the invention is to so construct and arrange the handle that, when curved outlines are to be cut, the operator may grasp the handle at a point relatively close to the cutting blades, and so that the tool may be readily swung about a vertical axis and while when straight cuts are to be made the handle may be grasped at the rear of the tool and the tool pushed forwardly to the work.
A further object is to provide a handle that may be quickly and readily set to different inclined positions for the more convenient manipulation of the tool when a cutting operation is to be performed in a place in which it would be difficult to handle the tool with the handle in its normal position.

Another object is to provide a shears construction which, while capable of use as a portable device may be readily secured to a stationary support for use as a fixed tool, as described more fully and claimed in our co-pending application Serial No. 228,725 filed October 26, 1927, of which this application, as to one form of the invention herein disclosed, is a division.

For the purpose of the present disclosure the invention is shown as applied to a shears of the type disclosed in our co-pending application Serial No. 227,388 filed October 20,
1927. It will be understood however that the principles of the present invention are not limited in their application to a shears of this particular type but that they are applicable to many different forms of shears as well as to other portable tools.

In the drawings, Fig. 1 is a side elevation of a shears having mounted thereon a handle constructed in accordance with the principles of our invention; Fig. 2 is an end view of the structure shown in Fig. 1; Fig. 3 is an enlarged section on the lines 3—3 of Fig. 4; Fig. 4 is an enlarged section on the line 4—4 of Fig. 3; Fig. 5 is a view similar to Fig. 1 showing a modified construction for the handle and Fig. 6 is a similar view showing a further modification.

As shown in the drawings the reference character 10 indicates the electric motor of a small power driven shears. The shears proper, as shown, comprises a pair of cutting blades 11, 12, one of which is rapidly oscillated or reciprocated for performing the cutting strokes. In the type of shears selected for illustration, the blade 11 is the movable blade, and the blade 12 is stationary. The blade 11 is actuated by any suitable mechanism but as the constructional details of said mechanism form no part of the present invention such details are not shown in the drawings.

The handle 13 preferably comprises two similar halves or sections formed of any suitable material and suitably secured together as by bolts, screws or rivets, 14. Said halves or sections are arranged as clearly shown in Fig. 1 to form a hollow, bail-type handle, structure in which a trigger, snap electric switch 15 is adapted to be received. The ends of the handle are formed to provide a pair of apertured bosses 16, 17. The boss 16 is rotatably engaged upon a stud or bushing 18 secured within a bracket 19 bolted to one end of the casing of motor 10, while the boss 17 is rotatably engaged upon a bushing 20 which is fixed within a boss 21 formed on the other end of said motor casing.

The handle sections at their lower ends adjacent to the boss 17 are cut away to provide a slot 22 thus resulting in a split clamp structure. A bolt 23 passes through a pair of aligned apertures formed in the small depending extensions 24 of the handle sections. One of said extensions is counter-bored or otherwise formed or recessed to receive the head 23ᵃ of said bolt and hold the latter against rotation. A wing nut 25 is in screw-threaded engagement with said bolt and serves, when said nut is tightened to lock the handle 13 in adjusted position. Electric lead wires 26 pass through an aperture 27 provided in the handle section and to the motor 10 and switch 15, an insulating bushing 28 being interposed in said aperture between the handle and lead wires.

It will be noted that the handle is shaped to provide two grip portions 13ª, 13ᵇ located respectively in front of, and to the rear of the electric switch 15. The rear grip portion 13ᵇ includes a finger rest 13ᶜ and recess 13ᵈ and each of the grip portions preferably also include a plurality of finger recesses 13ᵉ. The front grip portion 13ª is so located that when such portion is grasped for manipulating the shears, the weight of the tool is substantially equally distributed or balanced, and as a result the tool can be readily swung about a vertical axis as required to enable curved outlines to be cut.

It will be noted that, while the handle 13 has its pivotal axis in axial alignment with the armature shaft of the motor 10 and therefore in a position such that the major part of the weight of the tool is carried between the pivotal mountings of the handle, the cutting blades are located to one side of the common axis of the motor and handle mountings. Consequently when the handle is in the vertical position shown in Figs. 1 and 2 the hand of the operator will be at one side of the vertical plane in which the cutting edges of the cutting blades are located and as a result the operator will have a perfectly clear and full vision of the work at the place where the cutting operation is being performed without his vision of such place being obscured or interfered with by the hand which is holding the tool.

When it is desired to run a comparatively straight cut, for example, entirely across a wide sheet of material, it will be found more convenient to grasp the tool by the handle portion 13ᵇ and to rest the stationary blade cutter at the front of the tool upon any suitable support such as a work bench. The tool can then be thrust forwardly into the work to cause the cut to be performed at a comparatively high feeding rate.

The switch 15 is so located that it can be readily operated when the tool is grasped by either the handle portion 13ª or the portion 13ᵇ; in the former case the switch can be operated by either the little finger or the thumb of the operator depending upon the manner in which the hand is placed upon the handle portion 13ª, while in the latter case the index finger of the operator's hand would normally be allowed to rest within the recess 13ᵈ immediately adjacent to the trigger switch.

When it is desired to perform a cutting operation in cramped or crowded quarters such that the tool could not readily be manipulated with the handle in the vertical position shown in the drawings, the wing nut 25 is loosened, the handle is swung to any suitable or convenient position, and the wing nut is then tightened to hold the handle in the desired adjusted position.

In Fig. 5 I have shown the handle 13' as provided with but a single grip portion preferably made integral with a bail the legs 30 of which are pivotally secured to the motor casing by any suitable means such as the knurled head lock screws 31. A small lug 32 projecting from the ends of one or both of the bail legs 30 co-operates with the stop pins 33 for limiting the movement of the handle bail upon its pivots and for serving to indicate the proper positions of the handle best for manipulating the tool. It will be noted that the bail legs 30 of Fig. 5 are pivoted upon a vertical axis and that the grip handle 13' portion lies in a plane which extends at right angles to the bail legs 30 and midway between said legs.

In Fig. 6 the bail legs 30' are pivoted upon a vertical axis, the handle grip 13' extending in parallelism with said legs 30'. The screws 31 shown in Fig. 6 are similar to those shown in Fig. 5. Lugs 32' and stop pins 33' are provided in the structure shown in Fig. 6 for the same purpose as described in connection with Fig. 5.

In each form of the invention shown in Figs. 5 and 6 it will be noted that when the handle is in the full line position the grip is inclined to the horizontal and so that the portion grasped by the operation will extend at right angles to the line A—A which line extends in parallelism with line B—B. The latter line forms the bisector of the angle between the cutting edges of the blades 11, 12. As the most effective cutting will be performed when the work sheet is held at an angle to the shears, such as indicated by the line B—B, the inclination of the handle to the line A—A as shown and described will naturally tend to cause the operator to hold the tool relatively to the work in its most effective position.

It will be understood that in all forms of the invention illustrated the handle may be moved about its pivotal connection from the full line position shown to a position at right angles thereto, the full line position being the one in which the handle will normally be set and the other position being employed under special conditions such for example as cutting in close or cramped quarters. In each form of the invention it will also be understood that the handle will be clamped in the desired operating position by the bolts or screws 23 or 32 as the case may be.

We claim:

1. The combination with a portable tool of a handle pivotally secured thereto, said handle having a pair of hand grip portions, one of said grip portions having its center located substantially in the same vertical plane as the center of gravity of the tool so as to permit said tool to be swung readily about a vertical axis and the other of said handle portions being located rearwardly of said center of gravity for enabling pressure to be exerted readily for forcing the tool forwardly in a substantially horizontal direction.

2. A combination as set forth in claim 1 in which the tool includes an electric motor and a cutting tool actuated thereby and the handle has encased therein, an electric switch located between the two handle grip portions in a position to be readily actuated by the hand of the operator when either of said hand portions is grasped for manipulating the tool.

3. The combination with a portable tool having an electric motor and a cutter actuated thereby, of a hollow handle bail having a hand grip portion and formed of two similar longitudinally extending halves, and spanning said electric motor, a pair of pivots projecting laterally from said motor, approximately in the plane of the center of gravity of said motor bearings adapted to be engaged upon said pivots located at the ends of the legs of said handle and means for securing said handle in different adjusted positions about said pivots.

4. The combination with a portable tool having an electric motor and a cutting device actuated thereby, of a handle bail having a hand grip portion pivotally secured to said motor for movement between two extreme positions in one of which said handle is located above said tool and approximately in the same vertical plane as the center of gravity of the tool and in the other of which said handle is located approximately at right angles to said plane and means to secure said handle against movement in either of said positions.

5. The combination with a shears having a pair of cutting blades the cutting edges of which extend at an acute angle to each other and a motor for reciprocating one of said blades, and a handle having a bail portion pivotally connected to said motor and a grip portion extending substantially at right angles to the bisector of said angle.

6. The combination with a shears having a pair of cutting blades the cutting edges of which extend at an acute angle to each other and a motor for reciprocating one of said blades, and a handle having a bail portion pivotally connected to said motor and a grip portion extending substantially at right angles to the bisector of said angle and means to lock said handle in different adjusted positions upon its pivotal connection to said motor.

In testimony whereof we have hereunto set our hands.

ULRICH F. L. STEINDORFF.
GUSTAVE A. UNGAR.